United States Patent
Gao et al.

(10) Patent No.: US 8,271,630 B2
(45) Date of Patent: Sep. 18, 2012

(54) REMOTELY DEPLOYING COMPUTER PROGRAMS

(75) Inventors: Peng Gao, Beijing (CN); Cheng Liu, Beijing (CN); Yao Dong Qi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 12/790,030

(22) Filed: May 28, 2010

(65) Prior Publication Data
US 2010/0306356 A1   Dec. 2, 2010

(30) Foreign Application Priority Data
May 31, 2009 (CN) .......................... 2009 1 0138272

(51) Int. Cl.
*G06F 15/177* (2006.01)
(52) U.S. Cl. .......................... 709/222; 709/220; 709/221
(58) Field of Classification Search ........... 709/220–222
See application file for complete search history.

(56) References Cited

U.S. PATENT DOCUMENTS

| 7,673,023 | B1 * | 3/2010 | Nelson et al. | ................. 709/221 |
| 7,778,968 | B2 * | 8/2010 | Cherry | ........................ 707/611 |
| 2007/0043831 | A1 * | 2/2007 | Kessler et al. | ................. 709/219 |

OTHER PUBLICATIONS

N. Arshad, D. Heimbigner and A. L. Wolf; Deployment and Dynamic Reconfiguration Planning for Distributed Software Systems; Software Quality Control, vol. 15, Issue 3 (Sep. 2007), pp. 265-281.
P. Rigole; Task- and Resource-Aware Component Deployment in Ambient Intelligence Environments; Katholieke Universiteit Leuven, Thesis (Nov. 2006).

* cited by examiner

*Primary Examiner* — Mohamed Wasel
(74) *Attorney, Agent, or Firm* — Thomas E. Lees, LLC

(57) ABSTRACT

Methods and systems are provided for remotely deploying computer programs. Remote deployment is implemented by acquiring available resource information and related network resource information of a client in response to a request for remotely deploying a plurality of computer programs for the client; determining a deployment policy based on the available resource information and the related network resource information of the client; and remotely deploying transmission and installation of the plurality of computer programs based on the deployment policy.

12 Claims, 7 Drawing Sheets

REMOTELY DEPLOYING COMPUTER PROGRAMS

CROSS-REFERENCE TO RELATED APPLICATIONS

This application claims priority to Chinese Patent Application No. 200910138272.7, filed May 31, 2009, the disclosure of which is incorporated herein by reference.

BACKGROUND

Embodiments of the present invention relate to methods and systems for remotely deploying computer programs, and more particularly, to methods and systems for optimizing the remote deployment of computer programs.

Currently, many entities such as large corporations and other companies purchase a significant number of computing devices in order to set up computer nodes or cluster systems, which are deployed in bulk to address business demands. Moreover, such entities often operate several types of applications on different nodes as mandated by the specific needs and requirements of the entity. In this regard, such computer nodes or cluster systems cooperate to accomplish one or more applications through the connection of local area network or wide area network.

A high overhead is typically associated with the manual installation of required application programs onto a plurality of computers systems that make up such computer nodes or cluster systems. For instance, manual installation is often performed by installing application programs one by one, resulting in the significant usage of professional manpower and time. Moreover, manual installation will affect availability of the system, e.g., during the time required for manual configuration.

Remote deployment systems are capable of transmitting and installing computer programs to particular computer nodes across a wide area network. For instance, remote deployment may be implemented as single-thread remote deployment. In a single-thread implementation, programs are downloaded one by one to a local computing device. Once downloaded, the programs are sequentially installed. Accordingly, the total time of remote deployment is the sum of download time of all computer programs and installation time of all computer programs. Remote deployment may also be implemented in a dual-thread approach where a first thread is used to download programs and a second thread is used to begin installing the downloaded programs. Thus, the total time of remote deployment is the sum of download time of all computer programs and installation time of the computer programs that have not been installed as of the time when downloading of all computer programs is completed.

Regardless of whether deployment is manual or remote, single-threaded or dual-threaded, the above conventional approaches require users to expend a large amount of time. Especially where remote deployment is performed for a corporation having a lot of computer nodes. The time required for a conventional deployment greatly affects the normal operation and services provided by a corresponding corporation. Moreover, the time required for a conventional deployment significantly increases the corporation's management expenses.

BRIEF SUMMARY

According to aspects of the present invention, computer programs are remotely deployed by acquiring available resource information and related network resource information of a client in response to a request for remotely deploying a plurality of computer programs for the client, determining a deployment policy based on the available resource information and the related network resource information of the client, and remotely deploying transmission and installation of the plurality of computer programs based on the deployment policy.

BRIEF DESCRIPTION OF THE SEVERAL VIEWS OF THE DRAWINGS

The following detailed description of various embodiments and other aspects of the present invention can be best understood when read in conjunction with the following drawings, where like structure is indicated with like reference numerals, and in which.

DETAILED DESCRIPTION

Various aspects of the present invention provide approaches for optimizing the remote deployment of computer programs. As will be described in greater detail below, optimized remote deployment may be facilitated using a policy that is based on available resource information and network resource information of a client, thereby greatly improving the efficiency of remote deployment and saving a lot of time and cost for enterprise user.

Figure 1:
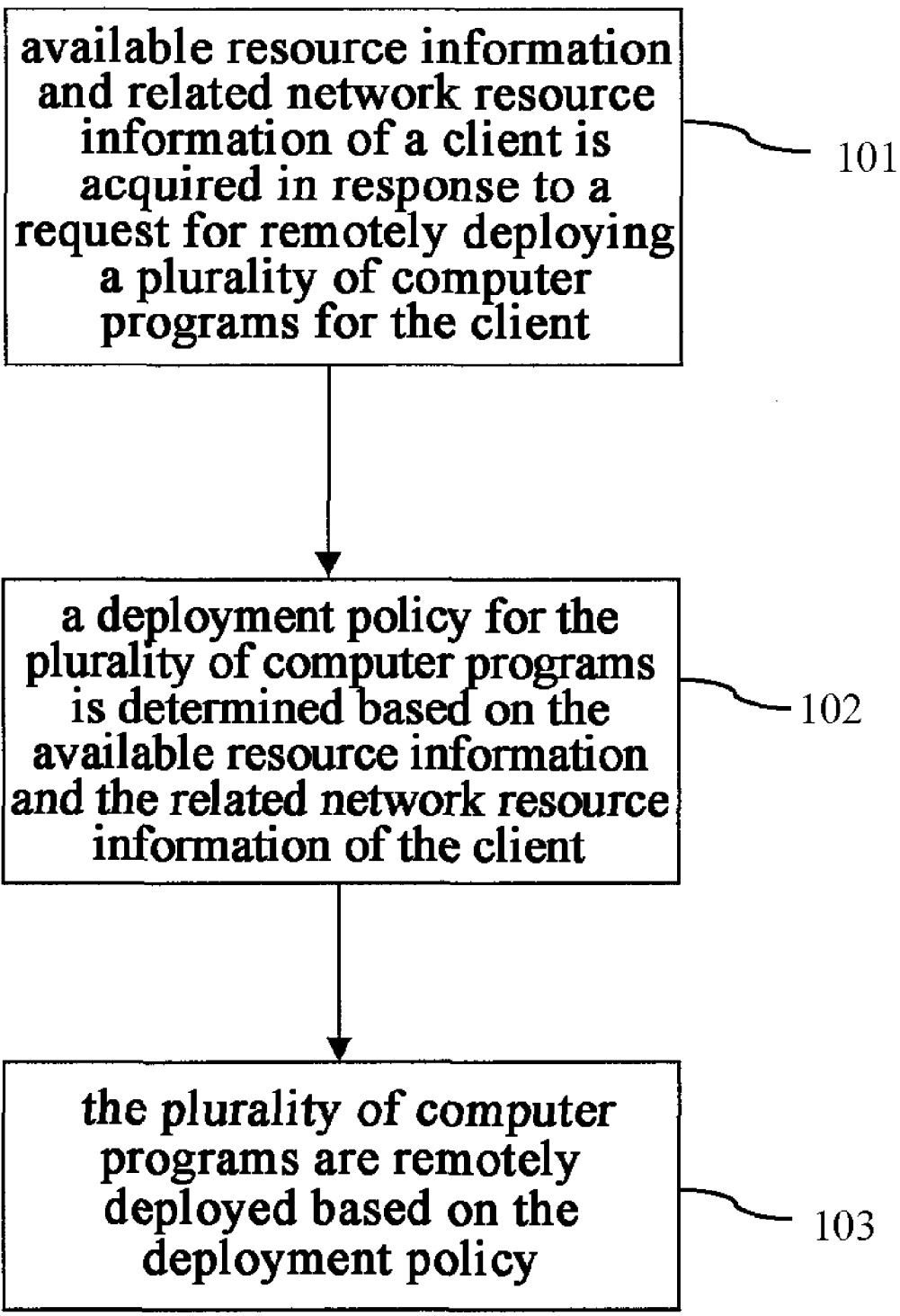
FIG. 1 illustrates a flowchart of a method for remotely deploying computer programs according to various aspects of the present invention.

Referring now to the figures, in particular to FIG. 1, a flowchart of a method for remotely deploying computer programs is illustrated according to aspects of the present invention. In step 101, available resource information and related network resource information of a client are acquired in response to a request for remotely deploying a plurality of computer programs for the client. In step 102, a deployment policy is determined based on the available resource information and the related network resource information of the client. In step 103, the plurality of computer programs are remotely deployed through the transmission and installation of the plurality of programs based on the deployment policy.

In step 101, available resource information and related network resource information of a client are acquired in response to a request for remotely deploying a plurality of computer programs for the client. Specifically, according to aspects of the present invention, a client may query a server for an installation list, and in response to receiving the installation list returned by the server, the client may issue a request for remotely deploying a plurality of computer programs in the installation list. According to alternative aspects of the present invention, a server may query for the installation list of a client, and in response to receiving the queried installation list, the server may issue a request for remotely deploying a plurality of computer programs for the client.

The acquired local available resource information of the client may include at least one of type and version of operating system, speed of CPU, average usage of CPU, available memory, available size of hard disk and IO speed. The local available resource information of the client may be acquired by a proxy program installed at client side, or the local available resource information may be acquired by the server through an IT management system. The local available resource information may also be acquired by third party software. After the local available resource information of the client is acquired, installation time of computer programs is computed, e.g., using a tool with a unified interface provided by a software provider. Input parameters of the interface may include data of the local available resource information of the client, including at least one of type and version of operating system, speed of CPU, average usage of CPU, available memory, available size of hard disk and IO speed. The output of the interface is the installation time of the corresponding computer programs.

In an illustrative exemplary implementation, the network resource information related to the client includes at least one of network transmission bandwidth and network transmission manner. The network transmission bandwidth information between the client and the server can be tested by a proxy program installed at the client side, or by sending a test data packet from the server for performing remote deployment to the client. The network transmission bandwidth information between the client and the server can also be acquired through an IT management system. Similarly, the network transmission bandwidth information between the client and the server can also be obtained by acquiring configuration information of an underlying network. From the perspective of a statistics sense, network transmission speed during a period of time may be considered to not fluctuate randomly and severely, even for the case that the network bandwidth fluctuates. Rather, transmission speed can be stabilized at a certain value for purposes of simplifying calculations. Thus, from the perspective of statistics, it is reasonable to acquire an average transmission speed during a period of time to use as a network bandwidth for that period of time.

Network bandwidth in an enterprise will be larger and more stable. However, the bandwidth for downloading software from the server is generally limited due to the requirement of maintaining stability of a corresponding intranet. Such limitation is generally set at server side. The attributes set include a number of contemporary downloading clients, a maximum downloading bandwidth of each client and the like. This can prevent a download service from affecting other programs, applications and services on the server due to excessive bandwidth occupation. Thus, the actual download bandwidth of an intranet is smaller than maximum bandwidth provided by the physical facility. For example, assume that the network sharing bandwidth is 1 gigabit per second (Gbps/s), the limit of number of download connections is 50, and the limit of download bandwidth of each connection is 10 megabits per second (Mbps/s). This can guarantee that other programs, applications and services will not be affected by network congestion when the server is performing downloading of the selected programs, even with a full load. Finally, such network download setting having high hardware configuration may further guarantee the stability of the intranet.

Various methods for computing network transmission bandwidth may be utilized according to different network transmission approaches. According to aspects of the present invention, for a conventional client-server (CS) approach, the server issues a data stream and the client receives data. However, a server may reach an upper limit of a bottleneck using this approach. For instance, the client-server approach mainly includes FTP, HTTPS and HTTP network transmission protocols. Taking FTP as an example, if a client wants to download a file, the client has to connect to a server providing FTP service. The client then downloads the file from the FTP server using an FTP protocol, which is a conventional client-server model. In the client-server approach, transmission speed between the client and the server is acquired, so that the acquired transmission speed can be used as a basis for computing the transmission time of computer programs.

In another illustrative example, for a peer-to-peer (P2P) approach, resources and services are shared directly among personal computers, compared to a conventional browser/server or client/server structure, where intervention and service of the server are needed. In a P2P structure, each personal computer acts the role of server and client simultaneously. When files or services of other computers are needed, two computers establish a relationship directly. For example, the owner computer may act as a client, but when responding to resource request of other computers, the owner computer becomes a server for providing resources and services. The BitTorrent (BT) transmission approach is an example of a typical P2P approach, where transmission speed between clients needs to be acquired to be used as a basis for computing network transmission bandwidth.

In step 102, an installation policy is determined based on the available resource information and the related network resource information of the client. Specifically, optimizing remote deployment time further comprises computing the installation time of the plurality of computer programs from the available resource information of the client. Transmission time of the plurality of computer programs is computed from the related network resource information, and the deployment policy is determined based on the installation time and the transmission time of the plurality of computer programs.

Figure 2:
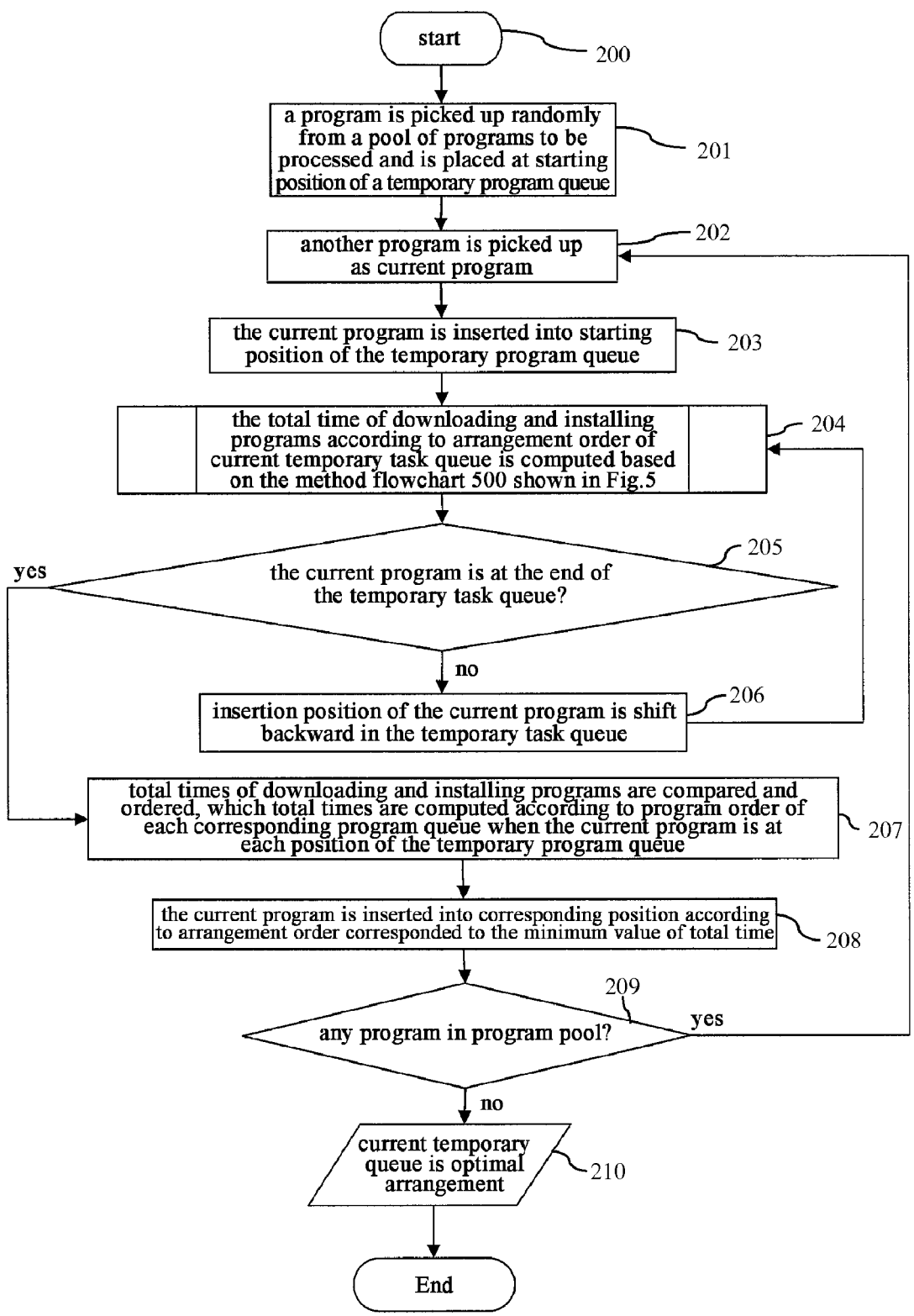
FIG. 2 illustrates a flowchart of a method for determining a deployment policy according to various aspects of the present invention.

FIG. 2 shows a flowchart 200 of a method for determining a deployment policy according to aspects of the present invention. In step 201, a computer program is picked up randomly from a task pool of computer programs to be processed and is placed at starting position of a temporary task queue. In step 202, a computer program is again picked up randomly from the task pool of the computer programs to be processed as current computer program. In step 203, the current computer program is inserted into the starting position of a temporary task queue. In step 204, the total time of downloading the queue and installing computer programs is computed according to an arrangement order of computer programs of the current temporary task queue based on an algorithmic flowchart 300 shown in FIG. 3.

In step 205, it is judged whether the total time of downloading the queue and installing computer programs is computed according to such arrangement order that the current computer program is inserted at end of temporary task queue. If the result is no, then in step 206, the insertion position of the current computer program is shifted backward in the temporary task queue and step 204 is repeated until computing of the total time of downloading the corresponding queue and installing computer programs is completed according to such queue arrangement order that the current computer program traverses all positions of the temporary task queue. That is, if the judging result of step 205 is yes, then in step 207, the total time of downloading the corresponding queue and installing computer programs are compared and ordered. The total times are computed according to an arrangement order of each computer program in the corresponding temporary task queue when the current computer program is at each position of the temporary task queue.

In step 208, the current computer program is inserted into a corresponding position of the queue according to the arrangement order corresponded to the minimum value of the total time of downloading and installing computer programs. In step 209, it is judged whether there is any computer program in the task pool of the computer programs to be processed. If the result is yes, then steps 202 to 208 are repeated, until there is no remaining computer program in the task pool of the computer programs to be processed. If the result is no, then the current temporary queue is an optimal arrangement, and the flow is terminated.

Figure 3:
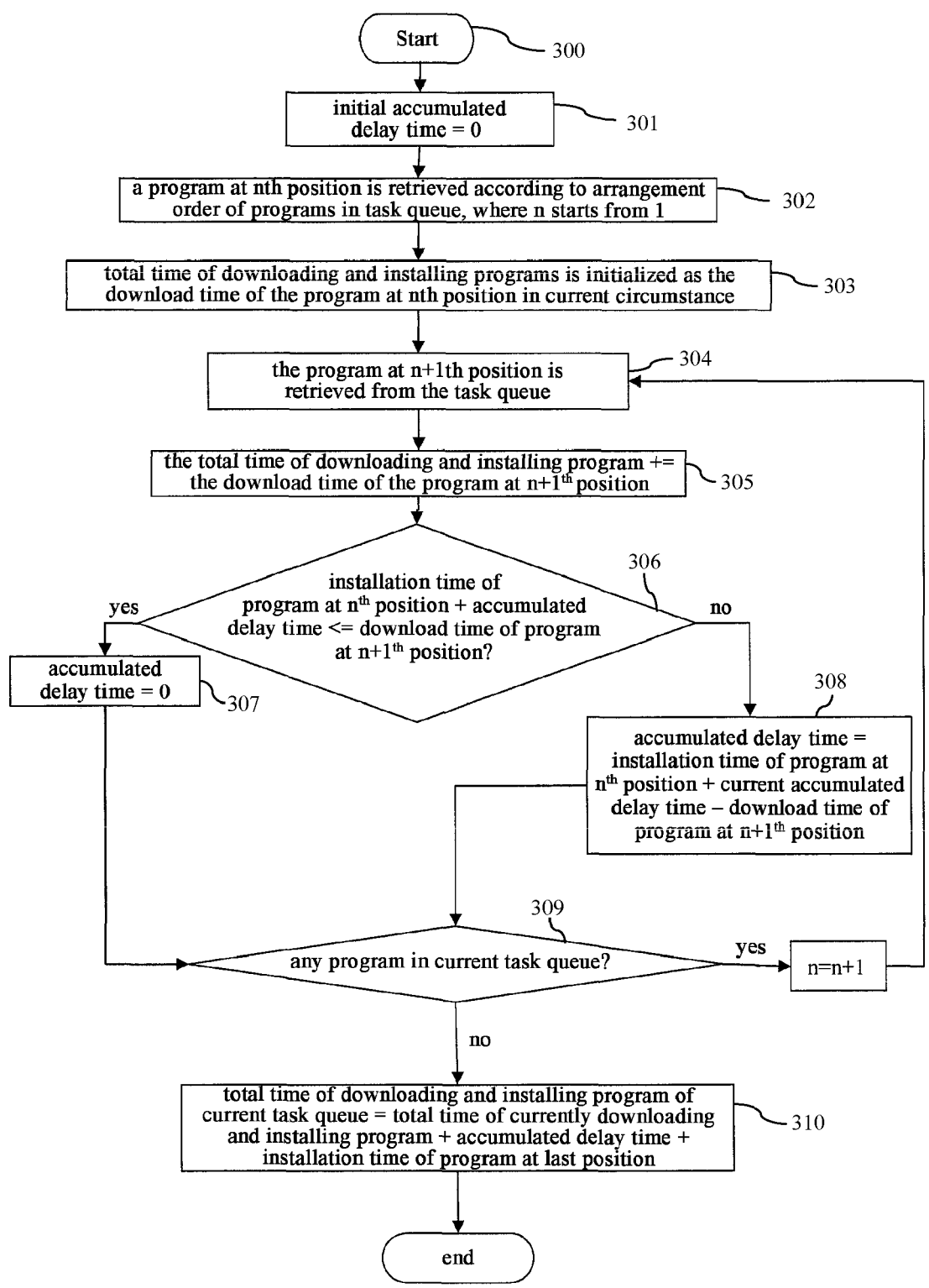
FIG. 3 illustrates a flowchart of a method for computing remote deployment time according to various aspects of the present invention.

FIG. 3 shows a flowchart 300 of a method for computing a total time of remote deployment according to aspects of the present invention. The accumulated delay time in the figure refers to, for the $n^{th}$ computer program, delay time between completion of downloading of that computer program and the start of installation. The reason for such delay is that the previously downloaded computer program has not completed installation yet when the $n^{th}$ computer is completely downloaded. The computer program that is previously downloaded but has not completed installation can generally include the $(n-1)^{th}$ software, but can also include the $(n-2)^{th}$ software or software downloaded earlier. Also, when the $(n-1)^{th}$ software is installed, there may be some delay, and such delay effect will lead to accumulating effect and affect the subsequent installation procedure.

In step 301, an initial accumulated delay time is set 0. In step 302, a computer program at the $n^{th}$ position is retrieved according to an arrangement order of the computer programs in the task queue, where n starts from 1. In step 303, the total time of downloading and installing computer programs is initialized as the download time of the computer program at the $n^{th}$ position in the current circumstance. In step 304, the computer program at the $(n+1)^{th}$ position is retrieved from the computer program queue. In step 305, the download time of the computer program at the $(n+1)^{th}$ position is added to the initialized total time of downloading and installing computer program.

In step 306, it is judged whether the sum of installation time of computer program at the nth position and accumulated delay time is smaller than or equal to the download time of a computer program at the $(n+1)^{th}$ position. If the result is yes, then in step 307, the accumulated delay time is 0. If the result is no, then in step 308, the accumulated delay time is computed as being equal to the installation time of computer program at the $n^{th}$ position+the current accumulated delay time−the download time of computer program at the $(n+1)^{th}$ position.

In step 309, it is judged whether there is any computer program in the current task queue. If the result is yes, then n=n+1, and the method returns to step 304 to be repeatedly performed. If the result is no, then the method proceeds to step 310, where the total time of downloading and installing the identified computer programs is computed according to the arrangement order of the current task queue. For example, the total time of downloading and installing the programs of the current task queue=the total time of currently downloading and installing the current computer program+any accumulated delay time+the installation time of the computer program at the final position.

The task queue resulting from the remote deployment method according to aspects of the present invention is a computer program task queue corresponded to a deployment policy having the shortest deployment time. For a process task with a small number of computer programs, a method of exhaustion can be used to compute the total process time required by various arrangements and combinations respectively so as to choose the optimal scheme.

However, for a process task with a large number of computer programs, the efficiency of the method according to aspects of the present invention, is higher so that more time cost can be saved. When the remote deployment method provided according to aspects of the invention simultaneously performs installing and downloading, only one download thread and one installation thread may be running at a same time, since the installation of two or more software programs and/or downloading of two or more software programs may not occur at the same time. For a current CPU processor, the two threads will not consume much CPU resources, because for download operations, data may be received, for example, by means of DMA transmission, which means that it will occupy very little CPU resources. In case that average usage of CPU, size of available memory and size of hard disk do not reach 100%. As such, thus the two threads will not present a condition that results in the performance of the CPU diminishing as a result of the two threads causing a depletion of hardware resources. The computer programs queued for deployment according to aspects of the present invention can be separately installed software or software packages. Still further, the computer programs queued for deployment according to aspects of the present invention can be individually installed components. Examples of deploying two components and three components according to aspects of the present invention are illustrated below.

A First Example for Remotely Deploying Two Components

Firstly, in response to a request by a client for querying a server for an installation list, the server returns the installation list which displays that the client needs to install components A and B. The server acquires available resource information and related network resource information of the client in response to a component installation request of the client. The client or the server tests the network resource information between the client and the server, the resulting transmission bandwidth between the client and the server is 1 M bytes/second, and ftp transmission protocol is used to transmit the tests and deployment. The client queries local available resource information, in which it is discovered that the operating system is Window 2000 sp4, the speed of CPU is 3 GHz, the average usage of CPU is 50%, the available memory is 1 GB, the available hard disk is 50 GB, and the I/O speed of hard disk is 10 Mbytes/second.

The server invokes API interfaces of the components to be processed which are provided, .e.g., by the corresponding software provider(s) based on the available resource information of the client, and computes that the installation time for component A is 5 minutes and that of component B is 10 minutes. The server computes the transmission time of the software based on the network resource information and the size of software. Here, component A is 600 Mbytes and component B is 900 Mbytes. The server also computes that the download time of component A is 10 minutes and the download time of component B is 15 minutes, based on network bandwidth.

A deployment policy is determined based on the algorithm described more fully herein, by using the above installation time and transmission time. According to the flowchart of FIG. 2, component B is randomly picked up from the task pool of the components to be processed and is placed at the starting position of a temporary task queue, then component A is picked up and is placed at the starting position of the temporary task queue. The total time TAB of completion of transmission and installation of components A and B to be processed is computed based on the order of component queue AB.

According to the method flowchart of FIG. 3, an initial accumulated delay time is 0. Since component B does not have an associated delay time for installation, the accumulated delay time is 0. Component A is retrieved. The total time of downloading and installing the queue is initialized as 10 minutes, which is download time of component A. Then component B is retrieved. At this point, the total time of downloading and installing the queue is equal to the total time of downloading and installing the current queue (10 minutes) plus download time of component B (15 minutes). Thus, the total time is 25 minutes. Then it is judged whether the sum of the installation time of component A (5 minutes) and current accumulated delay time (0) is smaller than or equal to download time of component B (15 minutes). The result is yes, thus the accumulated delay time is 0. Then the total time of completion of downloading and installing the queue is computed to be TAB=TAdownload+TBdownload+TBinstallation=10+15+10=35 minutes.

Component A is shifted backward to the end of queue, and the total time TBA of completion of transmission and installation of components A and B is computed based on the order of component queue BA. The initial accumulated delay time is 0. Component B is retrieved and the total time of downloading and installing the queue is initialized as 10 minutes, which is download time of component B. Component A is then retrieved. At this point, the total time of downloading and installing the queue is equal to the total time of downloading and installing the current queue (15 minutes) plus download time of component A (10 minutes), resulting in a total time of 25 minutes. Next, it is judged whether the sum of the installation time of component B (10 minutes) and current accumulated delay time (0) is smaller than or equal to download time of component A (10 minutes). The result is yes, thus the accumulated delay time is 0. Then the total time of completion of downloading and installing the queue is computed to be TBA=TBdownload+TAdownload+TAinstallation=15+10+5=30 minutes. It is determined by comparison that performing download and installation according to the order of queue BA is an optimal deployment policy.

Figure 4:
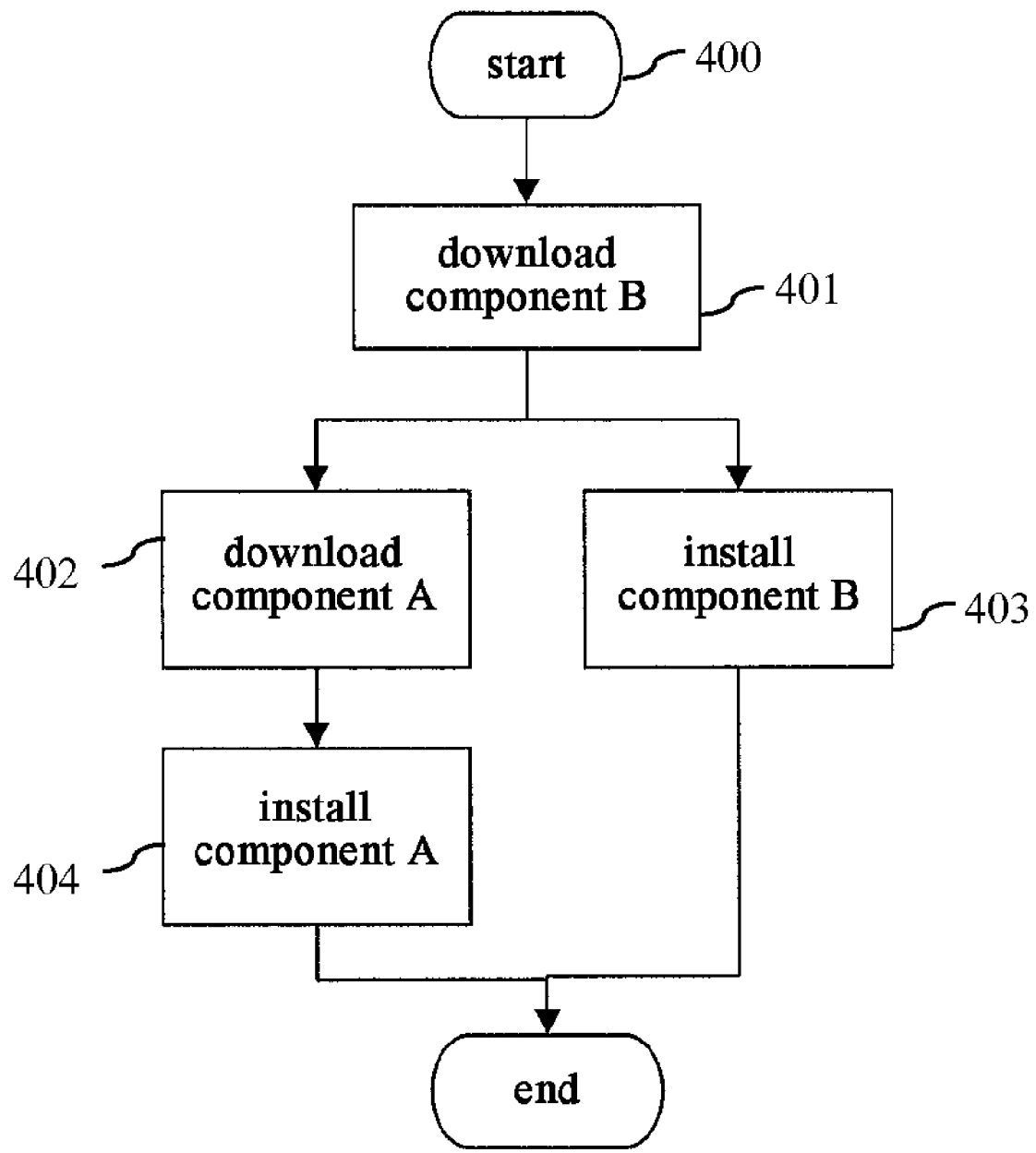
FIG. 4 illustrates a schematic diagram of a deployment policy of two components determined according to various aspects of the present invention.

FIG. 4 shows a process 400 of determining a deployment policy for two components according to aspects of the present invention. That is, first component B is downloaded at 401, then component A is downloaded at 402, component B is installed at 403 while downloading component A, and finally component A is installed at 404. The determined deployment policy is stored. Moreover, the server can monitor the client install components based on the above deployment policy and the server can also transmit the above deployment policy to the client, so that the client can perform component installation.

If components A and B are deployed by using a conventional single-thread remote deployment method, that is, components A and B are installed respectively after components A and B are downloaded to the local client respectively, based on the above provided exemplary installation time and transmission time of components A and B, it can be computed that the total time required for remote deployment=10+15+5+10=40 minutes. In contrast to the single-thread remote deployment method, the deployment time using the deployment policy according to aspects of the present invention saves 25% of time. In contrast to the deployment time (TAB) of another dual-thread deployment policy in an embodiment of the present invention, the deployment time of the deployment policy of the present invention saves 14% of time.

A Second Example of Remotely Deploying Three Components

In response to a request by a client for querying a server for an installation list, the server returns the installation list which displays that the client needs to install components A, B and C. The server acquires available resource information and related network resource information of the client in response to a component installation request of the client. The client or the server tests the network resource information between the client and the server, and the exemplary resulting transmission bandwidth between the client and the server is 1 M bytes/second, and ftp transmission protocol is used to transmit the test and deployment. The client queries local available resource information, in which it is discovered that the operating system is AIX 5.3.0.4, the speed of the CPU is 2.5 GHz, the average usage of the CPU is 30%, the available memory is 2 GB, the available hard disk is 100 GB, and the I/O speed of the hard disk is 8 Mbytes/second.

The server invokes API interfaces of the components to be processed which are provided by the corresponding software provider(s) based on the available resource information of the client, and computes that the installation time for component A is 1 minute, the installation time of component B is 5 minutes, and the installation time of component C is 10 minutes. The server computes the transmission time of the software based on the network resource information and the size of software. In the illustrative example, component A is 600 Mbytes, component B is 300 Mbytes and component C is 60 Mbytes, and computes that the download time of component A is 10 minutes, that of component B is 5 minutes and that of component C is 1 minute based on the network bandwidth.

A deployment policy is determined based on the algorithm described more fully herein, using the above installation time and transmission time. According to the flowchart of FIG. 2, component A is randomly picked up from the task pool of the components to be processed and is placed at the starting position of a temporary task queue. Then, component B is picked up and is placed at the starting position of the temporary task queue. The total time TBA of downloading and installing components A and B to be processed is computed based on the order of component queue BA. Since component A does not have delay time for installation, the accumulated delay time is 0. Thus the total time for completing download and installation of components A and B is TBA=TBdownload+TAdownload+TAinstallation=5+10+1=16 minutes.

The component B is shifted backward to the end of queue, the total time TAB of download and installation of components A and B to be processed is computed based on the order of component queue AB. Since component B does not have delay time for installation, the accumulated delay time is 0. Thus the total time for completing download and installation of components A and B is TAB=TAdownload+TBdownload+TBinstallation=10+5+5=20 minutes. By comparing lengths of these times, it is determined to retain the queue whose order is BA. Next, the last component C is pick up and is inserted at the starting position of queue BA to form a first type of component queue CBA. The total time TCBA of download and installation of components A, B and C to be processed is computed based on the order of component queue CBA according to the flowchart of FIG. 3.

A current accumulated delay time is initialized as 0. Component C is retrieved, and the total time required for the download and installation of the queue is initialized as 1 minute, which is download time of component C. Then component B is retrieved. At this point, the total time of download and installation of the queue is equal to the total time of download and installation of the current queue (1 minute) plus download time of component B (5 minutes), the result is 6 minutes. Next it is judged whether the sum of installation time of component C (10 minutes) and the current accumulated delay time (0) is smaller than or equal to download time of component B (5 minutes). The result is no. At this time, an accumulated delay time exists, and is expressed as: the accumulated delay time=installation time of component C+current accumulated delay time−download time of component B=10−5=5 minutes.

Then, component A in the queue is retrieved, download time of component A (10 minutes) is added to the total time of download and installation of that queue (6 minutes), such that the result is 16 minutes. Then, it is judged whether the sum of the installation time of component B (5 minutes) and the current accumulated delay time (5 minutes) is smaller than or equal to the download time of component A (10 minutes). The result is yes. The accumulated delay time is 0. Finally the total time of download and installation of the queue is computed to be TCBA=TCdownload+TBdownload+TAdownload+TAinstallation=1+5+10+1=17 minutes.

Next, the process returns to the method flowchart of FIG. 2, and component C is shifted backward to form a second type of component queue BCA. The total time TCBA of download and installation of components A, B and C to be processed is computed based on the order of component queue BCA, according to the method flowchart of FIG. 3.

The accumulated delay time is initialized as 0, component B is retrieved, and the total time of download and installation of the queue is initialized as 5 minutes, which is download time of component B. Component C is then retrieved. At this point, the total time of download and installation of the queue is equal to the total time of download and installation of the current queue (5 minutes) plus download time of component C (1 minute), the result is 6 minutes. Next, it is judged whether the sum of the installation time of component B (5 minutes) and current accumulated delay time (0) is smaller than or equal to download time of component C (1 minute). The result is no. As such, there is an accumulated delay time, expressed as: the accumulated delay time=installation time of component B+current accumulated delay time−download time of component C=5−1=4 minutes.

Then, component A in the queue is retrieved, and the download time of component A is added to the total time of download and installation of the queue, so the result is 16 minutes. Moreover, it is judged whether the sum of installation time of component C (10 minutes) and the current accumulated delay time (4 minutes) is smaller than or equal to download time of component A (10 minutes). The result is yes. As such, the accumulated delay time=installation time of component C+the current accumulated delay time−download time of component A=10+4−10=4 minutes. Finally the total time of the download and installation of the queue is computed to be TBCA=TBdownload+TCdownload+TAdownload+TAinstallation=5+10+1+4+1=21 minutes.

Component C is shift backward to the end of the queue so as to form a third type of component queue BAC, and the total time TBCA of download and installation of components A, B and C to be processed, is computed based on the order of component queue BAC, according to the flowchart of FIG. 3. The current accumulated delay time is initialized as 0. Component B is retrieved, and the total time of download and installation of the queue is initialized as 5 minutes, which is the download time of component B. Then component A is retrieved. At this point, the download time of component A (10 minutes) is added to the total time of download and installation of the queue, such that the result is 15 minutes.

Next, it is judged whether the sum of installation time of component B (5 minutes) and the current accumulated delay time (0) is smaller than or equal to download time of component A (10 minutes). The result is yes. Thus the accumulated delay time is 0. Then component C in the component queue is retrieved. The download time of component C (1 minute) is added to the total time of download and installation of that queue (15 minutes) such that the result is 16 minutes. It is judged whether the sum of the installation time of component A (1 minute) and the current accumulated delay time (0) is smaller than or equal to download time of component C (1 minute). The result is yes. As such, the accumulated delay time is 0. Finally the total time of download and installation of that queue is computed to be TBAC=TBdownload+TAdownload+TCdownload+TCinstallation=1+5+10+10=26 minutes.

It is determined by comparison that performing a download and installation according to the order of queue CBA is an optimal deployment policy.

Figure 5:
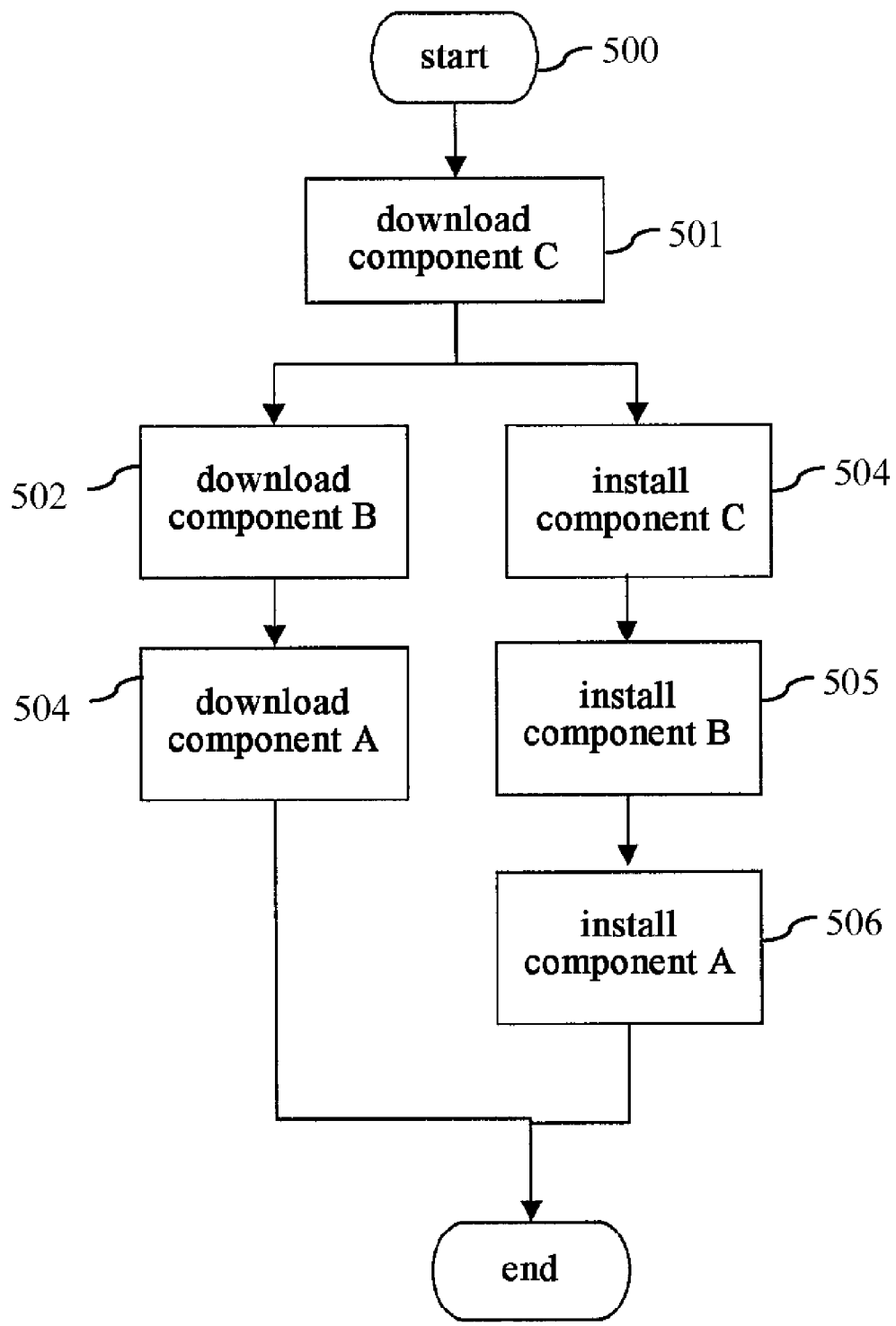
FIG. 5 illustrates a schematic diagram of a deployment policy of three components determined according to various aspects of the present invention.

FIG. 5 shows a process 500 of determining a deployment policy for three components according aspects of the present invention. That is, the first component C is downloaded at 501. Then components B and A are downloaded at 502 and 503 respectively. Component C is installed at 504 and component B is installed at 505, while downloading components B and A. Finally component A is installed at 506. Also, the determined deployment policy is stored. The server can monitor the client install components based on the above deployment policy and can also transmit the above deployment policy to the client, so that the client will perform component installation.

If components A, B and C are deployed by using the conventional single-thread remote deployment method of sequentially downloading, then installing components A, B, C, based on the above provided installation time and transmission time of components A, B and C, it can be computed that the total time required for remote deployment=10+5+1+1+5+10=32 minutes. In contrast to the single-thread remote deployment method, deployment time of the optimal deployment policy according to aspects of the present invention saves 47% of time. In contrast to the longest deployment time of the dual-thread deployment policy, that is, the total time TABC of performing download and installation according the order of queue ABC (30 minutes), deployment time of the deployment policy of the present invention saves 43% of time.

The method for remotely deploying computer programs according to aspects of the present invention, is targeted to minimize the time required to implement remote deployment. The method considers local available resource information and network resource information of the client as a whole, and provides users with a remote deployment policy for optimizing deployment time, thereby improving the efficiency of remote deployment and saving a great amount of valuable time resource for enterprise users that need to remotely deploy a lot of computing nodes.

During the procedure for remotely deploying computer programs which is implemented according to a deployment policy, the available resource information and related network resource information of a client may change due to actual operation conditions. Thus, there may be a need to dynamically adjust the deployment policy for the remaining computer programs. For example, the actual transmission speed of the computer programs and the computed transmission speed may not match. In such case, the actual transmission speed of the computer programs can be monitored. Also for example, there may be a need to monitor average usage of CPU changes, which affects installation time of the computer programs.

According to aspects of the present invention, a time interval for acquiring available resource information and related network resource information can be set, such that available resource information and related network resource information of a client can be re-acquired at a predetermined time. The deployment policy for the remaining computer programs is re-determined based on current available resource information and related network resource information of the client, and the remaining plurality of computer programs are remotely deployed based on the re-determined deployment policy.

Figure 6:
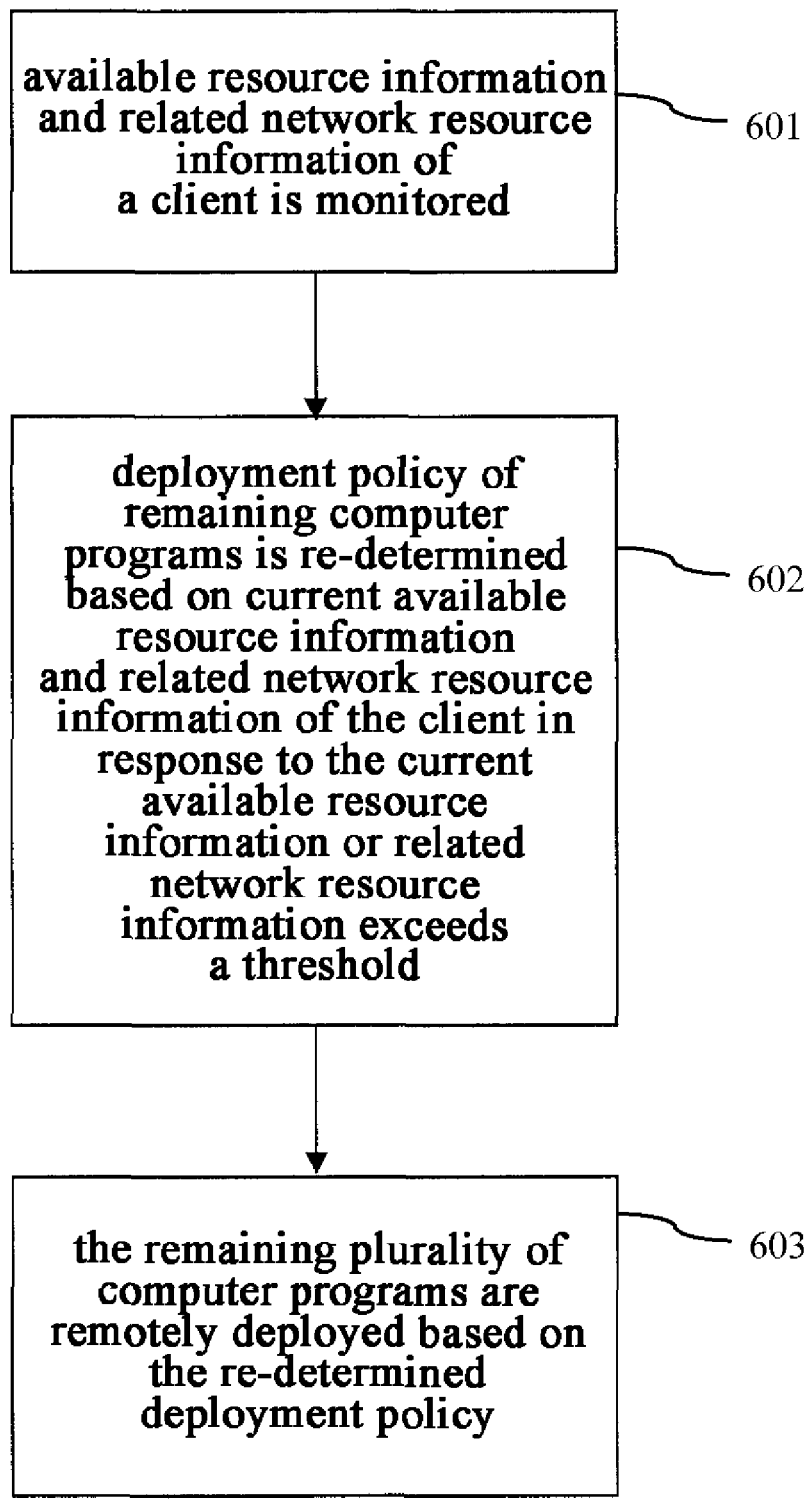
FIG. 6 illustrates a method for dynamically adjusting deployment policy according to according to various aspects of the present invention.

FIG. 6 shows a method for dynamically adjusting a deployment policy according to aspects of the present invention. As shown, in step 601, available resource information and related network resource information of a client is monitored. For example, the actual transmission speed of computer programs can be monitored, or average usage of CPU can be monitored. According to aspects of the present invention, the re-adjustment of the deployment policy of the remaining computer programs can be triggered based on a preset threshold. That is, a threshold can be preset based on available resource information and related network resource information. The preset threshold can be: the actual transmission speed of computer programs is higher/lower than computed transmission speed of the computer programs by a certain percent, average usage of CPU exceeds a prescribed percent, or size of available memory is lower than a prescribed percent, etc. Then, it is judged whether the current available resource information and the related network resource information exceed the threshold.

In step 602, the deployment policy of the remaining computer programs is re-determined based on current available resource information and related network resource information of the client in response to the current available resource information or related network resource information exceeds the threshold. Specifically, the deployment policy of the remaining computer programs can be re-determined based on the methods of the present invention as shown in FIGS. 2 and 3.

In step 603, the remaining plurality of computer programs is remotely deployed based on the re-determined deployment policy. The method for dynamically adjusting the deployment policy according to aspects of the present invention can dynamically adjust optimal deployment policy based on actual condition of the available resource information and related network resource information of the client, thereby further improving performance and efficiency of remote deployment.

Figure 7:
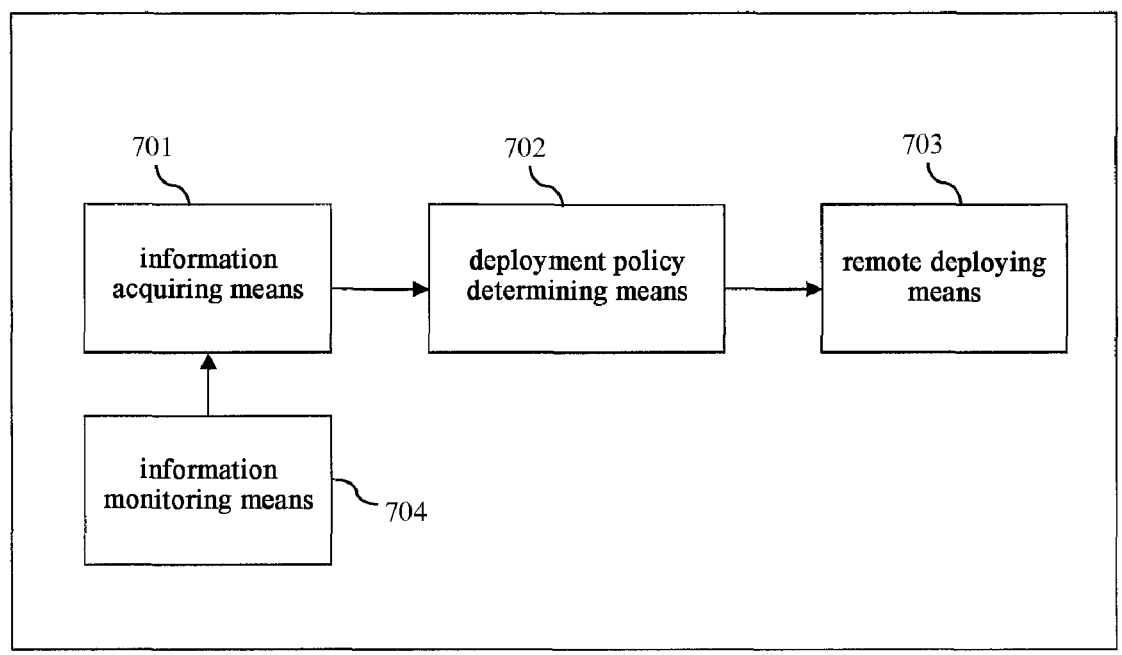
FIG. 7 illustrates a block diagram of a system for remotely deploying computer programs according to various aspects of the present invention.

The present invention also provides a system for remotely deploying computer programs. FIG. 7 shows a block diagram of a system for remotely deploying computer programs according to aspects of the present invention. As shown, the system for remotely deploying computer programs comprises an information acquiring means 701 configured to acquire available resource information and related network resource information of a client in response to a request for remotely deploying a plurality of computer programs for the client. The system also comprises a deployment policy determining means 702 configured to determine a deployment policy based on the available resource information and the related network resource information of the client. The system further comprises a remote deploying means 703 configured to remotely deploy transmission and installation of the plurality of computer programs based on the deployment policy.

The deployment policy determining means 702 is further configured to compute a remote deployment time based on installation time of the plurality of computer programs computed from the available resource information of the client and transmission time of the plurality of computer programs computed from the network resource information, and to determine the deployment policy of the plurality of computer programs based on the remote deployment time.

The system for remotely deploying computer programs further comprises an information monitoring means 704 configured to monitor the available resource information and the related network resource information of the client. The information monitoring means 704 further comprises a threshold setting means configured to preset a threshold for the available resource information or the related network resource information and a judging means configured to judge whether current available resource information or related network resource information exceeds the threshold.

The deployment policy determining means 702 may be further configured to re-determine a deployment policy for remaining computer programs based on current available resource information and related network resource information of the client in response to the current available resource information or related network resource information exceeds the threshold. Moreover, the remote deploying means may be further configured to remotely deploy transmission and installation of the remaining plurality of computer programs based on the re-determined deployment policy.

The present invention can be implemented in hardware, software, firmware or a combination thereof. The present invention can be implemented in a single computer system in a centralized form or in a distributed form, in the latter, different components are distributed throughout several interconnected computer systems. Any computer system or other device adapted to perform the method described in the invention is suitable. Preferably, aspects of the present invention can be implemented at server side in a combination of computer software and general-purpose computer hardware, in such implementation, when loaded and executed, the computer program will control the computer system to perform the method of the present invention or compose the system of the present invention. Aspects of the present invention can also be implemented at client side in form of a plug in.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The present invention may thus take the form of a computer program product embodied on a storage medium.

Any combination of one or more computer readable medium(s) may be utilized. The computer readable medium may be a computer readable signal medium or a computer readable storage medium. Any combination of one or more computer usable or computer readable medium(s) may be utilized. The computer-usable or computer-readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It should be understood by those skilled in the art that the scope of the various embodiments of the present invention, set out herein, are not limited to the explicit disclosure in the specification, and various variations and equivalents within the essential spirit of the embodiments of the present invention are also included.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of embodiments of the present invention have been presented for purposes of illustration and description, but is not intended to be exhaustive or limited to the embodiments of the present invention in the form disclosed. Many modifications and variations will be apparent to those of ordinary skill in the art without departing from the scope and spirit of the embodiments of the present invention.

Having thus described various embodiments of the present invention in detail herein, it will be apparent that modifications and variations are possible without departing from the scope of the embodiments of the present invention defined in the claims.

What is claimed is:

1. A method for remotely deploying computer programs, comprising:

acquiring available resource information and related network resource information of a client in response to a request for remotely deploying a plurality of computer programs for the client;

picking a select one of the plurality of computer programs for addition to a temporary queue; and repeating until all of the plurality of computer programs have been added to the temporary queue:

adding another one of the plurality of computer programs to the start of the temporary queue;
repeating until the added computer program is at the end of the temporary queue:
computing a total time of downloading and installing the computer programs in the temporary queue; and
shifting the added computer program backward toward the end of the temporary queue; and
inserting the added computer program at the position in the temporary queue according to an arrangement order corresponding to the minimum total time;
determining a deployment policy based on the available resource information and the related network resource information of the client and based upon the order of the plurality of computer programs in the temporary queue; and
remotely deploying transmission and installation of the plurality of computer programs based on the deployment policy.

2. The method according to claim 1, wherein:
determining the deployment policy further comprises:
computing a remote deployment time based on an installation time of the plurality of computer programs computed from the available resource information of the client and a transmission time of the plurality of computer programs computed from the network resource information; and
further comprising:
determining the deployment policy based on the remote deployment time.

3. The method according to claim 1, further comprising:
monitoring the available resource information and the related network resource information of the client to acquire current available resource information and related network resource information; and
re-adjusting the deployment policy of the remaining computer programs based upon the monitored available resource information and the related network resource information.

4. The method according to claim 3, wherein:
monitoring the available resource information and the related network resource information of the client further comprises:
presetting a threshold for at least one of: the available resource information and the related network resource information and judging whether current available information exceeds the preset threshold.

5. The method according to claim 4, wherein:
re-adjusting the deployment policy further comprises:
re-determining the deployment policy for remaining ones of the plurality of computer programs that have not been deployed, based on current available resource information and related network resource information of the client in response to determining that the current available information exceeds the predetermined threshold; and
further comprising:
remotely deploying the remaining ones of the plurality of computer programs based on the re-determined deployment policy.

6. The method according to claim 1, wherein computing a total time of downloading and installing the computer programs further comprises:
initializing an accumulated delay;
retrieving a program according to an arrangement order of computer programs in the temporary queue;
initializing the total time of downloading and installing computer programs as the download time of the program at a selected position within the temporary queue;
repeating for all of the computer programs listed in the temporary queue;
retrieving a next computer program in the temporary queue;
adding the download time of the next computer program to the total time of downloading and installing; and
accumulating a delay time upon determining that the installation time of the retrieved computer program plus any accumulated delay time is greater than the download time of the next computer program in the temporary queue; and
computing the total time of downloading and installing the computer programs in the temporary queue as the total time of currently downloading and installing the computer programs plus the accumulated delay time plus the installation time of the computer program at the last position in the queue.

7. A computer program product to remotely deploy computer programs, comprising:
a computer readable storage device having computer readable program code embodied therewith, the computer readable program code comprising:
computer readable program code configured to acquire available resource information and related network resource information of a client in response to a request for remotely deploying a plurality of computer programs for the client;
computer readable program code configured to pick a select one of the plurality of computer programs for addition to a temporary queue; and
computer readable program code configured to repeat until all of the plurality of computer programs have been added to the temporary queue;
computer readable program code configured to add another one of the plurality of computer programs to the start of the temporary queue;
computer readable program code configured to repeat until the added computer program is at the end of the temporary queue;
computer readable program code configured to compute a total time of downloading and installing the computer programs in the temporary queue; and
computer readable program code configured to shift the added computer program back ward toward the end of the temporary queue; and
computer readable program code configured to insert the added computer program at the position in the temporary queue according to an arrangement order corresponding to the minimum total time;
computer readable program code configured to determine a deployment policy based on the available resource information and the related network resource information of the client and based upon the order of the plurality of computer programs in the temporary queue; and
computer readable program code configured to remotely deploy transmission and installation of the plurality of computer programs based on the deployment policy.

8. The computer program product according to claim 7, wherein the computer readable program code configured to determine the deployment policy further comprises:
computer readable program code configured to compute a remote deployment time based on an installation time of the plurality of computer programs computed from the available resource information of the client and a transmission time of the plurality of computer programs computed from the network resource information; and further comprising:

computer readable program code configured to determine the deployment policy based on the remote deployment time.

9. The computer program product according to claim 7, further comprising:

computer readable program code configured to monitor the available resource information and the related network resource information of the client to acquire current available resource information and related network resource information; and computer readable program code configured to re-adjust the deployment policy of the remaining computer programs based upon the monitored available resource information and the related network resource information.

10. The computer program product according to claim 9, wherein computer readable program code configured to monitor the available resource information and the related network resource information of the client further comprises:

computer readable program code configured to preset a threshold for the available resource information or the related network resource information; and computer readable program code configured to judge whether current available resource information or related network resource information exceeds the threshold.

11. The computer program product according to claim 10, wherein the computer readable program code configured to determine the deployment policy further comprises:

computer readable program code configured to re-determine a deployment policy for remaining computer programs based on current available resource information and related network resource information of the client in response to determining that the current available resource information or related network resource information exceeds a threshold, and remotely deploying the remaining plurality of computer programs based on the re-determined deployment policy.

12. The computer program product according to claim 7, wherein the computer readable program code configured to compute a total time of downloading and installing the computer programs further comprises:

computer readable program code configured to initialize an accumulated delay;

computer readable program code configured to retrieve a program according to an arrangement order of computer programs in the temporary queue;

computer readable program code configured to initialize the total time of downloading and installing computer programs as the download time of the program at a selected position within the temporary queue;

computer readable program code configured to repeat for all of the computer programs listed in the temporary queue;

computer readable program code configured to retrieve a next computer program in the temporary queue;

computer readable program code configured to add the download time of the next computer program to the total time of downloading and installing; and computer readable program code configured to accumulate a delay time upon determining that the installation time of the retrieved computer program plus any accumulated delay time is greater than the download time of the next computer program in the temporary queue; and computer readable program code configured to compute the total time of downloading and installing the computer programs in the temporary queue as the total time of currently downloading and installing the computer programs plus the accumulated delay time plus the installation time of the computer program at the last position in the queue.

* * * * *